United States Patent
Sheng et al.

(10) Patent No.: US 11,810,170 B2
(45) Date of Patent: Nov. 7, 2023

(54) USER INTERFACE THAT PRE-POPULATES ITEMS IN AN ORDER MODULE FOR A USER OF AN ONLINE CONCIERGE SYSTEM USING A PREDICTION MODEL

(71) Applicant: Maplebear, Inc., San Francisco, CA (US)

(72) Inventors: Weian Sheng, Foster City, CA (US); Peng Qi, Menlo Park, CA (US); Changyao Chen, New York, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/232,651

(22) Filed: Apr. 16, 2021

(65) Prior Publication Data

US 2022/0335493 A1 Oct. 20, 2022

(51) Int. Cl.
*G06Q 30/00* (2023.01)
*G06Q 30/0601* (2023.01)
(Continued)

(52) U.S. Cl.
CPC ............ *G06Q 30/0619* (2013.01); *G06N 7/01* (2023.01); *G06Q 10/087* (2013.01);
(Continued)

(58) Field of Classification Search
CPC ............ G06Q 30/0619; G06Q 10/087; G06Q 30/0201; G06Q 30/0202; G06Q 30/0631;
(Continued)

(56) References Cited

U.S. PATENT DOCUMENTS

| | | | |
|---|---|---|---|
| 2002/0026380 A1* | 2/2002 | Su | G06Q 30/0641 705/26.8 |
| 2015/0356601 A1* | 12/2015 | Lu | G06Q 30/0261 705/14.53 |
| 2019/0236740 A1* | 8/2019 | Rao | G06N 20/20 |

FOREIGN PATENT DOCUMENTS

WO WO-2020027950 A1 * 2/2020 ............ G06N 3/0454

OTHER PUBLICATIONS

He, et al., Evolutionary food quality and location strategies for restaurants in competitive online-to-offline food ordering and delivery markets: An agent-based approach, https://doi.org/10.1016/j.ijpe.2018.05.008, International Journal of Production Economics, 2019 (Year: 2019).*

* cited by examiner

*Primary Examiner* — Patricia H Munson
*Assistant Examiner* — Uche Byrd
(74) *Attorney, Agent, or Firm* — Fenwick & West LLP

(57) ABSTRACT

An online concierge system maintains historical orders received from a user that include one or more items. For items included in one more historical orders, the online concierge system determines an interval between orders including an item, providing an indication of a frequency with which the user orders the item. When the online concierge system receives a request to create an order from the user, in response to an amount of time between a most recently received order including the item and a time when the request was received is within a threshold duration of the interval between orders including the item, the online concierge system selects an item from a category including the item. The selected item may be the item or an alternative item in the category. Subsequently, the online concierge system displays an interface for the user that is prepopulated with information identifying the selected item.

16 Claims, 5 Drawing Sheets

(51) Int. Cl.
*G06Q 30/0201* (2023.01)
*G06Q 30/0202* (2023.01)
*G06Q 10/087* (2023.01)
*G06N 7/01* (2023.01)

(52) U.S. Cl.
CPC ..... *G06Q 30/0201* (2013.01); *G06Q 30/0202* (2013.01); *G06Q 30/0631* (2013.01); *G06Q 30/0633* (2013.01); *G06Q 30/0641* (2013.01)

(58) Field of Classification Search
CPC . G06Q 30/0633; G06Q 30/0641; G06N 7/005
See application file for complete search history.

USER INTERFACE THAT PRE-POPULATES ITEMS IN AN ORDER MODULE FOR A USER OF AN ONLINE CONCIERGE SYSTEM USING A PREDICTION MODEL

BACKGROUND

This disclosure relates generally to ordering an item through an online concierge system, and more specifically to a user interface that prospectively includes one or more items in an order for a user based on a prediction model that uses, among other input data, items previously purchased by the user.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

To place an order through a conventional online concierge system, a user often has to navigate through long lists of items offered by a warehouse to include in the order. Similarly, a user may provide multiple search queries to an online concierge system to identify items for the user to include in an order via the online concierge system. When a uses frequently places orders through a conventional online concierge system, the user may spend a considerable amount of time navigating through listings of items offered by a warehouse or providing different search terms to the online concierge system to identify items for inclusion in an order. This increased time expended selecting items may decrease a frequency with which a user interacts with the online concierge system or a frequency with which the user subsequently places orders via the online concierge system.

SUMMARY

As a user places orders through an online concierge system, the online concierge system maintains a record of orders previously received from the user. This allows the online concierge system to maintain a record of historical orders received from the user. Each historical order includes one or more items selected by the user, a time when the online concierge system received the historical order, and a warehouse from which the one or more items were obtained. Based on items included in historical orders received from the user, the online concierge system may identify purchasing patterns of items by the user over time, allowing the online concierge system to simplify creation of subsequent orders by the user.

To simplify order creation for the user, and thereby minimize the number of interactions required with a computer user interface, the online concierge system retrieves historical orders previously received from the user. In some embodiments, the online concierge system retrieves historical orders received from the user during a specified time interval, such as within the specified time interval of a current time. Alternatively or additionally, the online concierge system retrieves a threshold number of historical orders received from the user. In some embodiments, the online concierge system retrieves historical orders received from the user that identify a specific warehouse, while in other embodiments the online concierge system retrieves historical orders that identify various warehouses. The online concierge system identifies items included in at least one historical order received from the user. In some embodiments, the online concierge system identifies a set of items included in at least one historical order in some embodiments.

For each of at least a set of items included in at least one historical order received from the user, the online concierge system determines time intervals between pairs of consecutive historical orders that include an item of the set from the times when the online concierge system received different historical orders including the item of the set. For example, the online concierge system determines a time when the online concierge system received a historical order including the item (e.g., milk) and determines a time when the online concierge system received a next consecutive historical order that also includes the item (e.g., the next received historical order including milk). From a difference between a time when the online concierge system received a historical order including an item of the set and an additional time when the online concierge system received a next consecutive historical order including the item of the set, the online concierge system determines a time interval between the consecutive historical orders including the item of the set. Using different pairs of consecutive historical orders including the item of the set, the online concierge system determines time intervals between different consecutive orders that include the item of the set, providing information about time intervals between the user's historical inclusion of the item of the set in orders.

From the determined time intervals for the item of the set, the online concierge system determines an interval between orders including the item of the set. In some embodiments, the online concierge system determines the interval between orders for the item of the set as an average of time intervals determined from different pairs of consecutive orders including the item of the set. In other embodiments, the online concierge system determines the interval for the item of the set as a median or a mode of the time intervals determined from different pairs of consecutive orders including the item of the set. The online concierge system stores the determined interval between orders in association with the user and with the item of the set, allowing the online concierge system to maintain a frequency with which the user orders various items of the set.

When the online concierge system receives a request to create an order from the user, the online concierge system leverages the stored intervals between orders including items of the set to simplify order creation for the user. From the stored intervals between orders for items of the set and items included in orders previously received from the user, the online concierge system identifies an item for which the stored interval between orders including the item equals or exceeds an amount of time between a most recent previously received order including the item and a time when the request to create the order was received by the online concierge system. In some embodiments, the online concierge system identifies an item for which the stored interval between orders including the item is within a threshold duration of an amount of time between a most recent previously received order including the item and a time when the request to create the order was received by the online concierge system.

For the identified item, the online concierge system determines a category of items including the identified item. The online concierge system obtains or maintains a catalog of items offered by various warehouses, with items in the category included in one or more categories. For example, a category includes items each having a common attribute or a group of common attributes. This allows the catalog to identify related, or similar items based on common attributes of the items. In various embodiments, the catalog associates an identifier of a category with identifiers of items included in the category. Hence, the online concierge system determines the category of the identified item by identifying an identifier of the identified item.

The online concierge system leverages the determined category including the identified item to simplify creation of the order by the user by selecting an item from the determined category including the identified item. In some embodiments, the online concierge system selects the identified item that was included in the order previously received from the user. However, in other embodiments, the online concierge system selects an alternative item from the determined category. For example, the online concierge system applies a trained purchase model to items of the determined category. The trained purchase model outputs a probability of the user purchasing an item. In some embodiments, the online concierge system applies the trained purchase model to each combination of the user and an item of the determined category and selects an item within the determined category having a maximum probability of being purchased by the user. This allows the online concierge system to select an item of the determined category that the user is most likely to purchase based on prior orders in which items were purchased by the user. In some embodiments, the trained purchase model accounts for a difference between a probability of the user purchasing the identified item included in one or more previous orders and a probability of the user purchasing an alternative item within the category. For example, the online concierge system ranks other items within the category based on differences between a probability of the user purchasing another item within the category and a probability of the user purchasing the identified item so other items having smaller differences have higher positions in the ranking. The online concierge system selects an alternative item of the other items having at least a threshold position in the ranking.

Further, the online concierge system may apply a machine-learned item availability model to the items in the category and a warehouse identified by the request to create the order, determining a predicted availability of different items in the category at the warehouse identified for fulfilling the order. In response to the predicted availability of the identified item included in the previously received order being less than a threshold availability, the online concierge system selects an alternative item from the category. When selecting the alternative item, the online concierge system selects the alternative item based on the probabilities of the user purchasing alternative items in the category (e.g., selects an alternative item having a maximum probability of being purchased by the user) in some embodiments. Further, the online concierge system may limit selection of an alternative item based on predicted availabilities or alternative items, so a selected alternative item has at least a threshold predicted availability, has a maximum predicted availability, or has at least a threshold position in a ranking of alternative items based on predicted availabilities; the online concierge system may select an alternative item based on a combination of a probability of the user purchasing the alternative item and a predicted availability of the item. For example, the online concierge system selects a group of alternative items having at least a threshold predicted availability (or having at least a threshold position in a ranking based on predicted availabilities) and selects an alternative item of the group having a at least a threshold probability of being purchased by the user (e.g., a maximum probability of being purchased by the user) or having at least a threshold position in a ranking of the group of alternative products based on probabilities of being purchased by the user. Alternatively, the online concierge system retrieves information stored in association with the user identifying one or more replacement items for the identified item that were authorized or previously selected by the user and selects a replacement item stored in association with the user for the identified item.

To simplify creation of the requested order for the user, the online concierge system generates an interface for the order for which the request was received that includes information identifying the selected item from the determined category. For example, the interface includes a list of items included in the order that has information identifying the selected item form the determined category included in the list. When the interface is displayed to the user, the interface indicates that the selected item from the determined category is included in the order. Hence, the interface displays the selected item from the determined category as included in the order without the user identifying the selected item from the determined category for inclusion in the order. Through the interface, the user may remove the information identifying the selected item from the determined category to remove the selected item from the user, but without receiving an input from the user to remove the selected item from the order from the user, the selected item remains included in the order from the user. Thus, rather than manually locate and identify the selected item for inclusion in the order, the interface is prepopulated with information identifying the selected item from the determined category, reducing a number of interfaces for the user to navigate and reducing an amount of information provided by the user to create the order corresponding to the received request.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
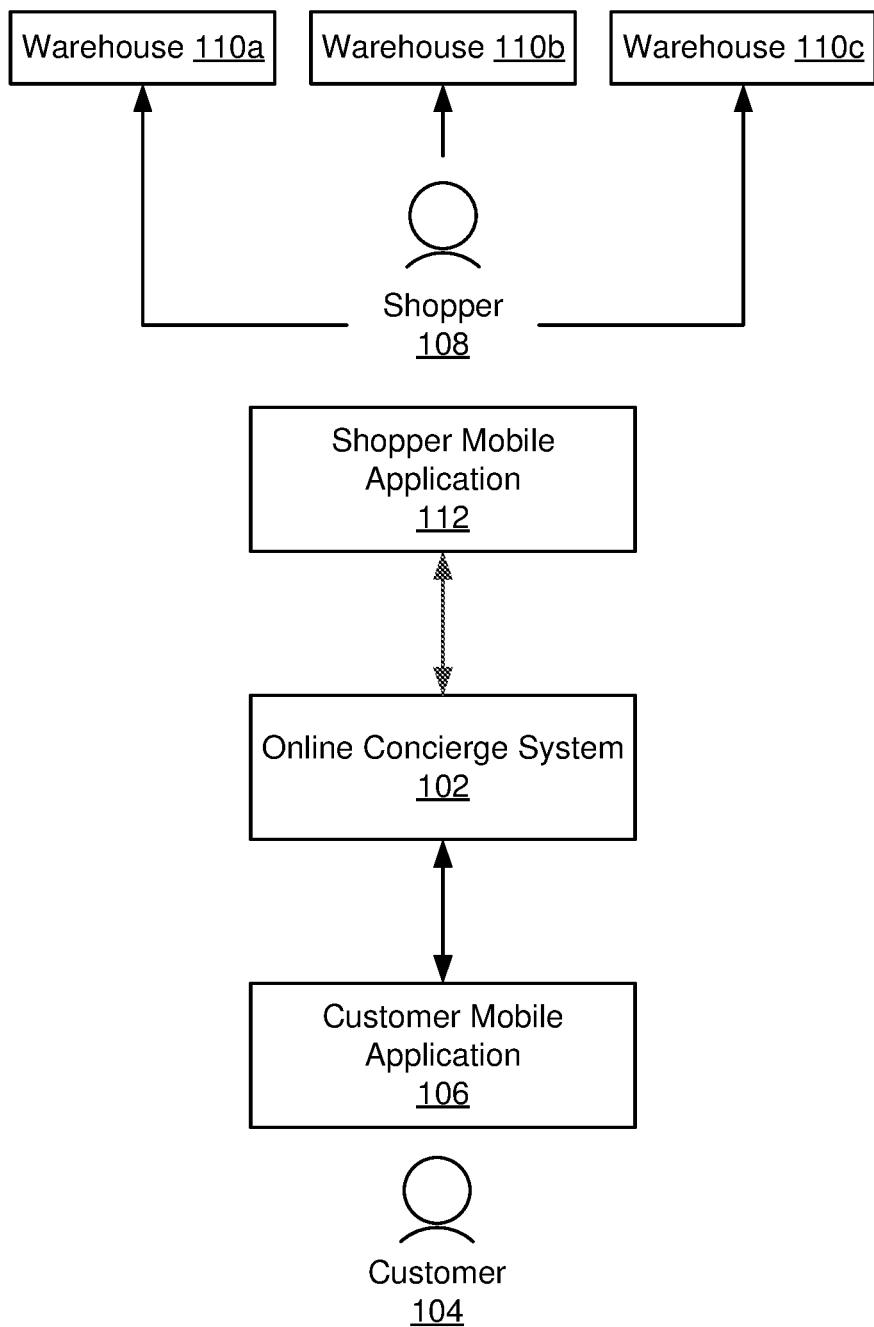
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
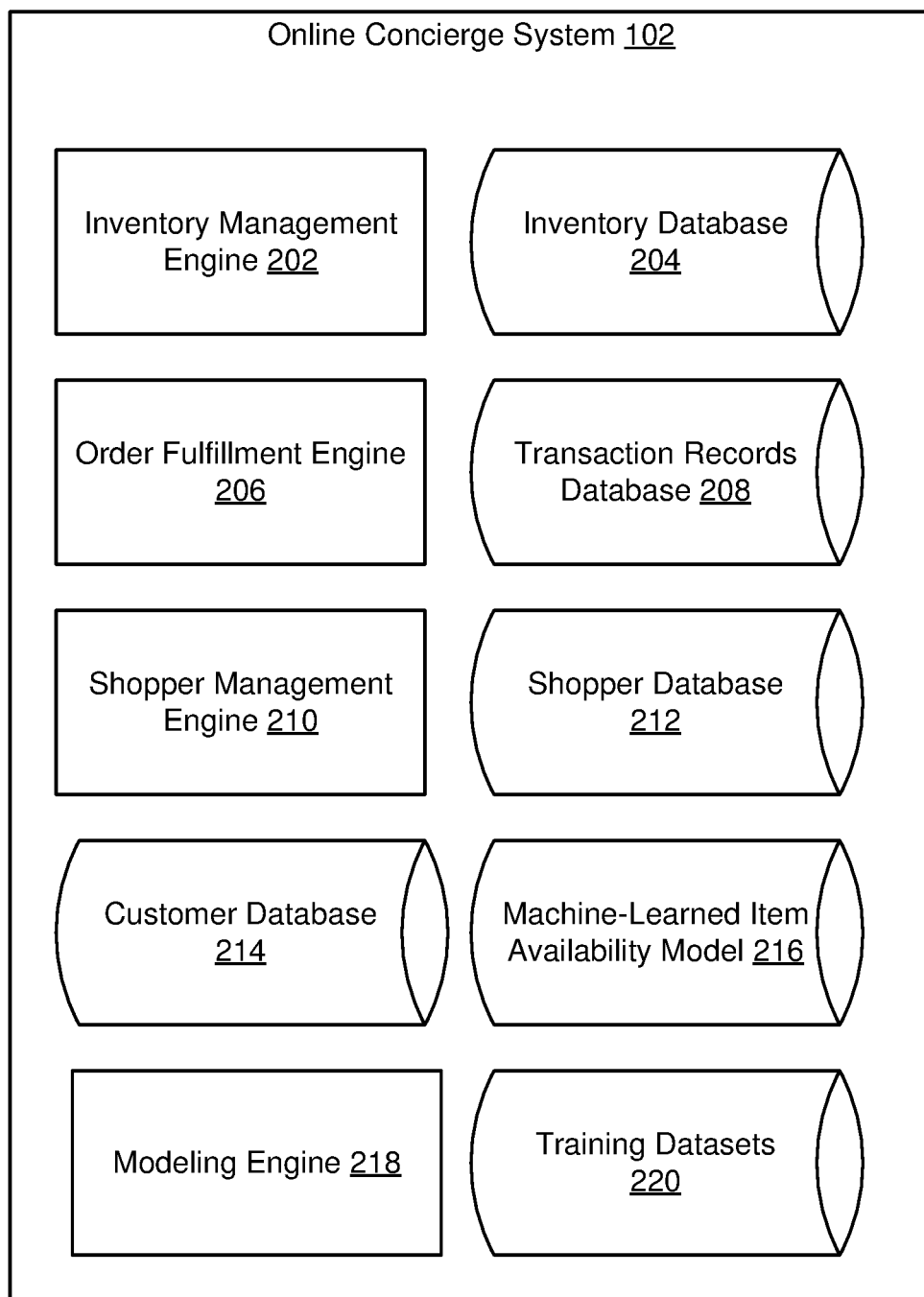
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 leverages historical orders received from a user from the transaction records database 208 to simplify order creation for a user. In various embodiments, the order fulfillment engine 206 retrieves historical orders received for a user and determines an interval between orders including an item for one or more items included in the historical orders. As further described below in conjunction with FIGS. 4 and 5, the order fulfillment engine 206 uses time intervals between consecutive historical orders including an item to determine the interval between orders including the item. The order fulfillment engine 206 stores a determined interval between orders including an item in association with the item and in association with the user, allowing the online concierge system 102 to maintain information describing frequencies with which different users include one or more items in orders.

For a user, the order fulfillment engine 206 leverages the interval between orders for one or more items to simplify subsequent creation of an order for the user. In various embodiments, when the order fulfillment engine 206 receives a request from a user to create an order, the order fulfillment engine 206 identifies an item for which an amount of time between a previously received order from the user including the item and a time when the request to create the order was received is within a threshold duration of an interval between orders including the item determined for the user. For example, the order fulfillment engine 206 identifies an item for which an amount of time between a most recent previous order including the item was received and a time when the request was received is within one day of the interval between orders including the item determined for the user. The order fulfillment engine 206 generates an interface for display to the user, such as through the customer mobile application 106 that is prepopulated with information identifying the identified item, simplifying inclusion of the identified item in the order created in response to the request. In some embodiments, as further described below in conjunction with FIG. 5, the order fulfillment engine 206 determines a category that includes the identified item and selects an item from the determined category for which information describing the selected item is included in the generated interface for initial display to the user. This allows the order fulfillment engine to select from multiple items in a category of items having one or more common attributes with the identified item, allowing the order fulfillment engine to leverage a greater number of users when selecting an item for prepopulating in the interface for presentation to the user without receiving an input from the user.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model that outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
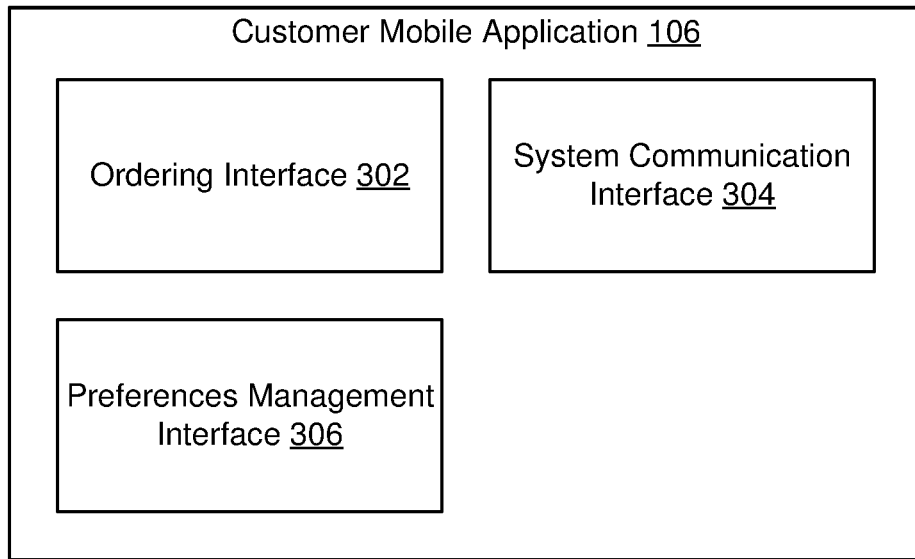
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
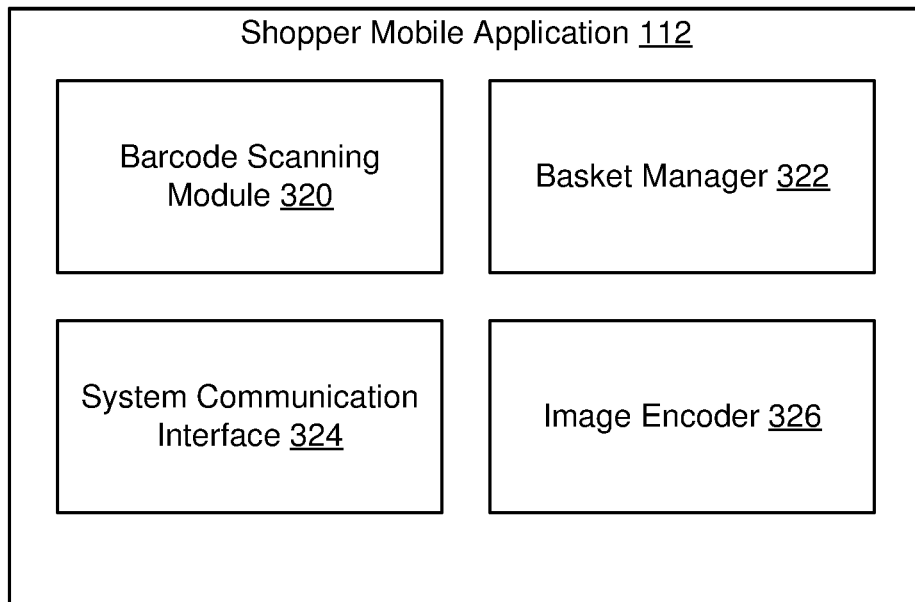
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
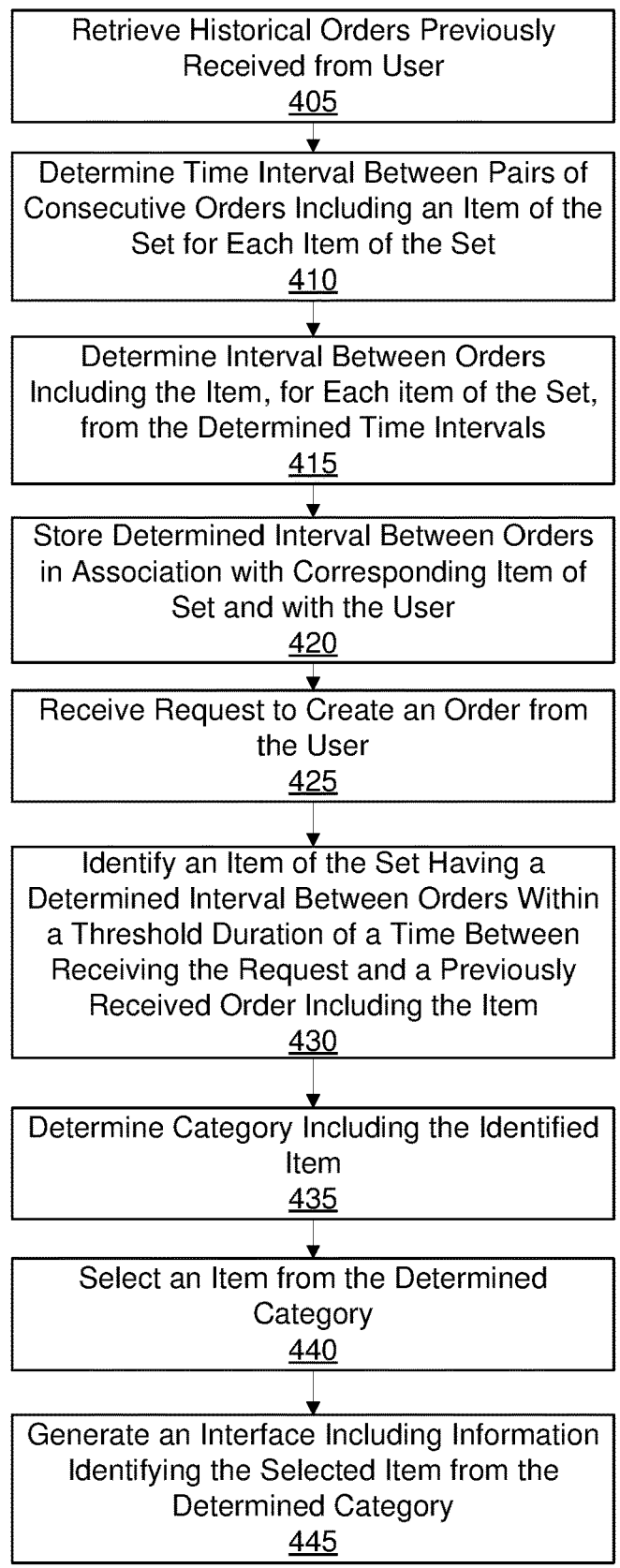
FIG. 4 is a flowchart of a method for an online concierge system to preselect one or more items for inclusion in an order from a user based on historical orders received from the user, according to one embodiment.

Preselecting One or More Items for an Order from a User from Prior Orders from the User FIG. 4 is a flowchart of one embodiment of a method for an online concierge system 102 to preselect one or more items for inclusion in an order from a user based on historical orders received from the user. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

As a user places orders through an online concierge system 102, the online concierge system 102 maintains a record of orders previously received from the user. This allows the online concierge system 102 to maintain a record of historical orders received from the user. Each historical order includes one or more items selected by the user, a time when the online concierge system 102 received the historical order, and a warehouse 110 from which the one or more items were obtained. Based on items included in historical orders received from the user, the online concierge system 102 may identify purchasing patterns of items by the user over time, allowing the online concierge system 102 to simplify creation of subsequent orders by the user.

To simplify order creation for the user, the online concierge system 102 retrieves 405 historical orders previously received from the user. In some embodiments, the online concierge system 102 retrieves 405 historical orders received from the user during a specified time interval, such as within the specified time interval of a current time. Alternatively or additionally, the online concierge system 102 retrieves 405 a threshold number of historical orders received from the user. In some embodiments, the online concierge system 102 retrieves 405 historical orders received from the user that identify a specific warehouse 110, while in other embodiments the online concierge system 102 retrieves 405 historical orders that identify various warehouses 110.

The online concierge system 102 identifies items included in at least one historical order received from the user. In one embodiment, the online concierge system 102 identifies a set of items included in at least one historical order. For example, the online concierge system 102 identifies items included in at least a threshold number of historical orders as the set of items.

For each of at least a set of items included in at least one historical order received from the user, the online concierge system 102 determines timing between orders including an item of the set of items. Thus, for an item of the set, the online concierge system 102 determines 410 time intervals between pairs of consecutive historical orders that include the item of the set from the times when the online concierge system 102 received different historical orders including the item of the set. For example, the online concierge system 102 determines a time when the online concierge system 102 received a historical order including the item (e.g., milk) and determines a time when the online concierge system 102 received a next consecutive historical order that also includes the item (e.g., the next received historical order including milk). From a difference between a time when the online concierge system 102 received a historical order including an item of the set and an additional time when the online concierge system 102 received a next consecutive historical order including the item of the set, the online concierge system 102 determines 410 a time interval between the consecutive historical orders including the item of the set. Using different pairs of consecutive historical orders including the item of the set, the online concierge system 102 determines 410 time intervals between different consecutive orders 102 that include the item of the set 102, providing information about time intervals between the user's historical inclusion of the item of the set in orders.

From the determined time intervals for the item of the set, the online concierge system 102 determines 415 an interval between orders including the item of the set. In some embodiments, the online concierge system 102 determines 415 the interval between orders for the item of the set as an average of time intervals determined 410 from different pairs of consecutive orders including the item of the set. In other embodiments, the online concierge system 102 determines 415 the interval for the item of the set as a median or a mode of the time intervals determined 410 from different pairs of consecutive orders including the item of the set. Additionally or alternatively, the online concierge system 102 differently weights time intervals determined 410 for the item of the set and averages the weighted time intervals to determine 415 the interval between orders for the item of the set. For example, a time interval determined 410 from a pair of consecutive orders including an order nearer in time to a time when the interval between orders including the item of the set is determined 415 has a higher weight than a weight of a time interval determined 410 from a pair of consecutive orders including an order farther in time from the time when the interval between orders including the item of the set is determined 415.

The online concierge system 102 stores 420 the determined interval between orders in association with the user and with the item of the set. By determining 415 an interval between orders for various items in the set and storing a determined interval in association with a corresponding item of the set and the user, the online concierge system 102 determines intervals describing amounts of time between the user including an item of the set in orders. This allows the online concierge system 102 to determine a frequency with which the user orders various items of the set.

When the online concierge system 102 receives 425 a request to create an order from the user, the online concierge system 102 leverages the stored intervals between orders including items of the set to simplify order creation for the user. In response to receiving 425 the request to create the order from the user, the online concierge system 102 retrieves the stored intervals between orders associated with the user and associated with items of the set and orders previously received from the user. From the stored intervals between orders for items of the set and items included in orders previously received from the user, the online concierge system 102 identifies 430 an item for which the stored interval between orders including the item equals or exceeds an amount of time between a most recent previously received order including the item and a time when the request to create the order was received 425 by the online concierge system 102. In some embodiments, the online concierge system 102 identifies 430 an item for which the stored interval between orders including the item is within a threshold duration of an amount of time between a most recent previously received order including the item and a time when the request to create the order was received 425 by the online concierge system 102.

For example, when the online concierge system 102 receives 425 the request to create the order from the user, the online concierge system 102 determines an amount of time between a time when the request to create the order was received 425 and a most recent order previously received from the user including an item. The online concierge system 102 also retrieves orders previously received from the user and compares the determined amount of time to stored intervals between orders associated with the user and associated with items of the set. From the comparison, the online concierge system 102 identifies 430 an item of the set having a stored interval between orders that is within a threshold duration of the determined amount of time. For example, the stored interval between orders for milk is one week, so the online concierge system 102 identifies 430 milk in response to a determined amount of time between when the request to create the order was received 425 and a most recent order including milk being a week or more.

For the identified item, the online concierge system 102 determines 435 a category of items including the identified item. The online concierge system 102 obtains or maintains a catalog of items offered by various warehouses, with items in the category included in one or more categories. For example, a category includes items each having a common attribute or a group of common attributes. This allows the catalog to identify related, or similar items based on common attributes of the items. In various embodiments, the catalog associates an identifier of a category with identifiers of items included in the category. Hence, the online concierge system 102 determines 435 the category of the identified item by identifying an identifier of the identified item and The online concierge system 102 leverages the determined category including the identified item to simplify creation of the order by the user by selecting 440 an item from the determined category including the identified item. In some embodiments, the online concierge system 102 selects 440 the identified item, which was included in the order previously received from the user. This allows the online concierge system 102 to select the same item that the user previously included in the order.

However, in other embodiments, the online concierge system 102 selects 440 an alternative item from the determined category. For example, the online concierge system 102 applies a trained purchase model to items of the determined category. The trained purchase model outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.). In some embodiments, the online concierge system 102 applies the trained purchase model to each combination of the user and an item of the determined category and selects 440 an item within the determined category having a maximum probability of being purchased by the user. This allows the online concierge system 102 to select 440 an item of the determined category that the user is most likely to purchase based on prior orders in which items were purchased by the user. In some embodiments, the trained purchase model accounts for a difference between a probability of the user purchasing the identified item included in one or more previous orders and a probability of the user purchasing an alternative item within the category. For example, the online concierge system 102 ranks other items within the category based on differences between a probability of the user purchasing another item within the category and a probability of the user purchasing the identified item so other items having smaller differences have higher positions in the ranking. The online concierge system 102 selects 440 an alternative item of the other items having at least a threshold position in the ranking. This allows the online concierge system 102 to maximize a probability of the user purchasing an alternative item from the determined category when an alternative item other than the identified item included in a previous order is selected 440.

The online concierge system 102 applies the machine-learned item availability model 216, further described above in conjunction with FIG. 2 to the items in the category and a warehouse 110 identified by the request to create the order, determining a predicted availability of different items in the category at the warehouse 110 identified for fulfilling the order. In response to the predicted availability of the identified item included in the previously received order being less than a threshold availability, the online concierge system 102 selects 440 an alternative item from the category. When selecting 440 the alternative item, the online concierge system 102 selects 440 the alternative item based on the probabilities of the user purchasing alternative items in the category (e.g., selects 440 an alternative item having a maximum probability of being purchased by the user) in some embodiments. Alternatively, the online concierge system 102 retrieves information stored in association with the user identifying one or more replacement items for the identified item that were authorized or previously selected by the user and selects 440 a replacement item stored in association with the user for the identified item. The online concierge system 102 may account for probabilities of the user purchasing various replacement items if multiple replacement items for the identified item are stored in association with the user (e.g., by selecting 440 a replacement item having a maximum probability of being purchased by the user).

In some embodiments, an entity associated with an item in the determined category provides the online concierge system 102 with compensation for selecting 440 the item from the category. Example entities associated with an item include a warehouse 110 from which the item is obtained, a manufacturer of the item, a brand offering the item, or any other suitable entity. The online concierge system 102 receives compensation from the entity for selecting 440 the item in some embodiments. Alternatively, the online concierge system 102 receives compensation from the entity for the user completing an order and purchasing the item. The online concierge system 102 may account for compensation received from one or more entities when selecting 440 an item of the determined category. For example, the online concierge system 102 determines expected values for various items for which the online concierge system 102 receives compensation as a product of an amount of compensation received for selecting 440 an item and a probability of the user purchasing the item. The online concierge system 102 selects 440 an item having a maximum expected value or ranks items by their corresponding expected values and selects 440 an item having at least a threshold position in the ranking (e.g., having a maximum position in the ranking). In some embodiments, the online concierge system 102 converts a probability of the user purchasing an item and an amount of compensation the online concierge system 102 receives for selecting 440 the item into a common unit of measurement. For example, the online concierge system 102 applies a conversion factor to the probability of the user purchasing an item that converts the probability of the user purchasing the item to an organic amount of compensation. Alternatively, the online concierge system 102 applies a conversion factor to the amount of compensation the online concierge system 102 received for selecting 440 the item to a compensated probability. Converting the amount of compensation received by the online concierge system 102 for selecting the item and the probability of the user purchasing the item into a common unit of measurement allows the online concierge system 102 to calculate a value for each item of the category, both items for which the online concierge system 102 receives compensation for selecting 440 and items for which the online concierge system 102 does not receive compensation for selecting 440. The online concierge system 102 ranks the items of the category based on their corresponding values and selects 440 an item of the category having at least a threshold position in the ranking (e.g., a maximum position in the ranking) or selects 440 an item having a maximum value.

To simplify creation of the requested order for the user, the online concierge system 102 generates 445 an interface for the order for which the request was received that includes information identifying the selected item from the determined category. For example, the interface includes a list of items included in the order that has information identifying the selected item form the determined category included in the list. When the interface is displayed to the user, the interface indicates that the selected item from the determined category is included in the order. Hence, the interface displays the selected item from the determined category as included in the order without the user identifying the selected item from the determined category for inclusion in the order. Through the interface, the user may remove the information identifying the selected item from the determined category to remove the selected item from the user, but without receiving an input from the user to remove the selected item from the order from the user, the selected item remains included in the order from the user. Thus, rather than manually locate and identify the selected item for inclusion in the order, the interface is prepopulated with information identifying the selected item from the determined category, reducing a number of interfaces for the user to navigate and reducing an amount of information provided by the user to create the order corresponding to the received request.

Figure 5:
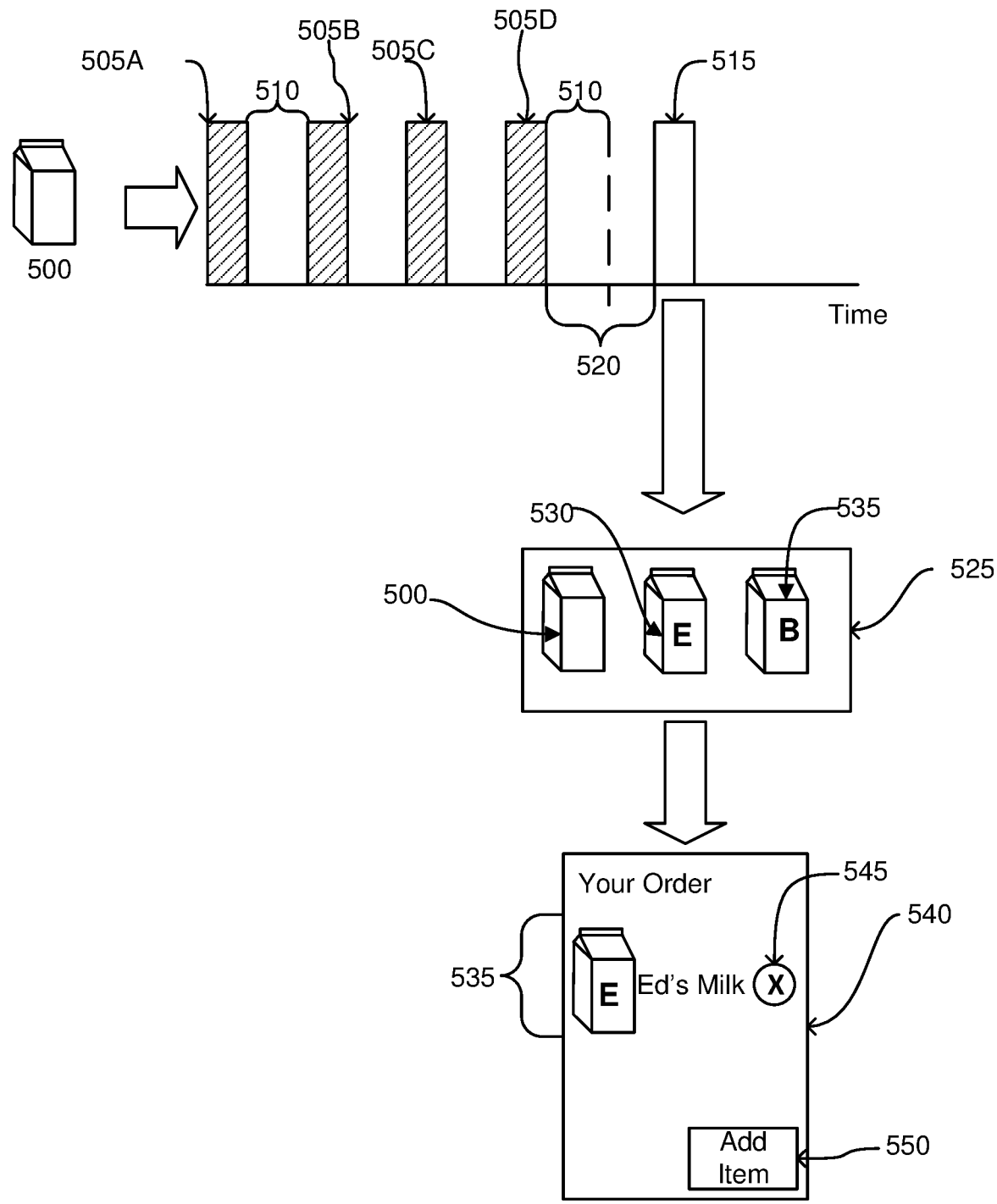
FIG. 5 is a conceptual diagram of a method for an online concierge system to preselect one or more items for inclusion in an order from a user based on historical orders received from the user, in accordance with an embodiment.

FIG. 5 is a conceptual diagram of an online concierge system 102 preselecting one or more items for inclusion in an order from a user based on historical orders received from the user. For purposes of illustration, FIG. 5 describes using information about orders including an item 500. The online concierge system 102 retrieves historical orders 505A, 505B, 505C, 505D (also referred to individually and collectively using reference number 505) previously received from the user that included the item 500. Each historical order 505 includes a timestamp indicating when the historical order 500 was received by the online concierge system 102. From the timestamps when different pairs of consecutive historical orders 505 including the item 500 were received, the online concierge system 102 determines time intervals between each pair of consecutive historical orders 505 including the item 500. In the example of FIG. 5, the online concierge system 102 determines a time interval between historical order 505A and historical order 505B, a time interval between historical order 505B and historical order 505C, and a time interval between historical order 505C and historical order 505D. From the time intervals between the pairs of consecutive historical orders 505 including the item 500, the online concierge system 102 determines an interval 510 between orders including the item 500, as further described above in conjunction with FIG. 4. This allows the online concierge system 102 to leverage timing information for the historical orders 505 including the item 500 to determine a frequency with which the user includes the item 500 in orders.

When the online concierge system 102 receives a request 515 from the user to create an order, the online concierge system 102 compares the interval 510 between orders including the item 500 to an amount of time between a time when a most recent previously received order from the user including the item 500 and when the request 515 to create the order was received. In the example of FIG. 5, historical order 505D is the most recently received request from the user including the item 500, so the online concierge system 102 compares the amount of time 520 between the time when historical order 505D was received and the time when the request 515 to create the order was received to the interval 510 between orders including the item 500. In the example of FIG. 5, the amount of time 520 between the time when historical order 505D was received and the time when the request 515 to create the order is greater than the interval 510 between orders including the item 500.

In response to the amount of time 520 between the time when historical order 505D was received and the time when the request 515 to create the order being greater than the interval 510 between orders including the item 500 (or withing a threshold duration of the interval 510 between orders including the item, as further described above in conjunction with FIG. 4), the online concierge system 102 determines a category 530 including the item 500 and selects an item 535 from the determined category. As further described above in conjunction with FIG. 4, the category includes items having one or more common characteristics, so items within the category have some similarity to each other. For purposes of illustration, FIG. 5 shows the category 530 including the item 500, additional item 535, and additional item 540; however, the category 530 may include any number of items in addition to the item 500. As further described above in conjunction with FIG. 4, the online concierge system 102 selects an item from the category 530. For example, the online concierge system 102 selects the item 500 from the category 530 based on the user's prior inclusion of the item 500 in the historical orders 505. However, as further described above in conjunction with FIG. 4, the online concierge system 102 may select another item from the category 530 based on one or more criteria. For example, the online concierge system 102 accounts for predicted availability of the item 500, as well as of the additional item 535, and the additional item 540, and may account for a probability of the user purchasing the item 500, the additional item 525, and the additional item 540, when selecting an item from the category 530.

In the example of FIG. 5, the online concierge system 102 selects the additional item 535 from the category 530, using one or more selection criteria further described above in conjunction with FIG. 4. To simplify creation of the order corresponding to the received request 515, the online concierge system 102 generates an interface 540 for display to the user that is prepopulated with information describing the additional item 535. For example, the interface 540 includes a name and an image of the additional item 535, but may include any suitable information identifying the additional item 535 in various embodiments. The online concierge system 102 includes the information describing the additional item 535 (or whichever item is selected from the category 530) without receiving input from the user, so the interface 540 includes the information describing the additional item 535 when initially displayed to the user. The interface 540 includes additional elements in various embodiments. For example, the interface 540 shown in FIG. 5 includes a removal element 545 that, when selected by the user, removes the additional item 535 from the order. Similarly, the interface 540 includes an addition element 550 that, when selected by the user, prompts the user to enter a search query or other information for selecting another item to include in the order. Hence, selecting the additional item, 535, or another item from the category 530, allows the online concierge system 102 to streamline creation of an order by prepopulating the interface 540 for creating the order with information describing one or more items based on prior purchase patterns of the user. This reduces an amount of interaction with the online concierge system 102 by the user (e.g., a number of queries provided to the online concierge system 102, a number of interfaces for the user to navigate through) to create an order for fulfillment by the online concierge system 102.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, at an online concierge system comprising at least one processor and memory:
    retrieving, by the online concierge system, historical orders from a user received by the online concierge system over a network, each historical order including one or more items selected by the user and associated with a time when the online concierge system received a historical order from the user;
    for each of at least a set of items included in at least one historical order:
        determining, by the online concierge system, time intervals between pairs of consecutive historical orders including an item of the set;
        determining, by the online concierge system, an interval between orders including the item of the set from the determined time intervals; and
        storing, at the online concierge system, the interval between orders in association with the user and in association with the item of the set;
    receiving, by the online concierge system, a request to create an order from the user;
    identifying, by the online concierge system, an item having an interval between orders greater than an amount of time between a time of a most recent previously received order including the item and a time when the request to create the order was received that is within a threshold duration of the interval between orders stored in association with the user and with the item;
    determining, by the online concierge system, a category of items including the identified item;
    selecting, by the online concierge system, an item from the determined category, comprising:
        retrieving, by the online concierge system, an amount of compensation the online concierge system receives from an entity associated with one or more items of the determined category for selecting an item of the one or more items;
        accessing, by the online concierge system, a purchase model for predicting a probability of the user purchasing an item in the determined category, wherein the purchase model comprises a machine learning model trained by:
            accessing a training dataset that describes attributes of an item of a determined category and historical purchase information of the item included in the historical orders from the user;
            performing a learning process on the purchase model to train the weights of the model based on the training dataset;
            updating the training dataset with recent purchase information; and
            retraining the purchase model based on the updated training dataset;
        determining, by the online concierge system, a probability of the user purchasing each item of the determined category, wherein determining the probability comprises: applying the trained purchase model to each combination of the user and an item in the determined category;
        converting, by the online concierge system, the amounts of compensation the online concierge system receives for selecting the item of the one or more items and the determined probabilities into a common unit of measurement;
calculating, by the online concierge system, a value for each item of the determined category by combining the converted amounts of compensation the online concierge system receives and the determined probabilities into a common unit of measurement; and
selecting, by the online concierge system, an item of the determined category based on the calculated values; and
generating, by the online concierge system, an interface for the order for which the request was received that includes information identifying the selected item from the determined category for display to the user without receiving input from the user.

2. The method of claim 1, wherein identifying the item having the interval between orders greater than the amount of time between the time of the most recent previously received order including the item and the time when the request to create the order was received that is within the threshold duration of the interval between orders stored in association with the user and with the item comprises:
identifying an item for which the amount of time between the time of the most recent previously received order including the item and the time when the request to create the order was received is greater than the interval between orders stored in association with the user and with the item.

3. The method of claim 1, wherein selecting, by the online concierge system, the item from the determined category comprises:
selecting the identified item.

4. The method of claim 1, wherein selecting, by the online concierge system, the item from the determined category comprises:
selecting an item having a maximum probability of being purchased by the user from the determined category.

5. The method of claim 1, wherein selecting, by the online concierge system, the item from the determined category comprises:
determining differences between a probability of the user purchasing the identified item and probabilities of the user purchasing each alternative item in the determined category;
selecting an alternative item in the determined category having a minimum difference between the probability of the user purchasing the identified item and the probability of the user purchasing the alternative item in the determined category.

6. The method of claim 1, wherein selecting, by the online concierge system, the item from the determined category comprises:
determining a predicted availability of the identified item at a warehouse identified by the request;
in response to the predicted availability of the identified item at the warehouse being less than a threshold availability, determining a probability of the user purchasing each alternative item in the determined category; and
selecting an alternative item in the determined category having a maximum probability of being purchased by the user.

7. The method of claim 1, wherein selecting, by the online concierge system, the item from the determined category comprises:
determining a predicted availability of the identified item at a warehouse identified by the request;
in response to the predicted availability of the identified item at the warehouse being less than a threshold availability, retrieving stored information associated with the user by the online concierge system identifying one or more replacement items for the identified item; and
selecting a replacement item.

8. The method of claim 1, wherein selecting, by the online concierge system, the item from the determined category comprises:
determining a predicted availability of the identified item at a warehouse identified by the request;
in response to the predicted availability of the identified item at the warehouse being less than a threshold availability, retrieving stored information associated with the user by the online concierge system identifying one or more replacement items for the identified item;
determining a probability of the user purchasing each of the replacement items; and
selecting a replacement item having a maximum probability of being purchased by the user.

9. A computer program product comprising a non-transitory computer readable storage medium having instructions encoded thereon that, when executed by a processor, cause the processor to:
retrieve historical orders from a user received by an online concierge system, each historical order including one or more items selected by the user and associated with a time when the online concierge system received a historical order from the user;
for each of at least a set of items included in at least one historical order:
determine time intervals between pairs of consecutive historical orders including an item of the set;
determine an interval between orders including the item of the set from the determined time intervals; and
store, at the online concierge system, the interval between orders in association with the user and in association with the item of the set;
receive a request to create an order from the user;
identify an item having an interval between orders greater than an amount of time between a time of a most recent previously received order including the item and a time when the request to create the order was received that is within a threshold duration of the interval between orders stored in association with the user and with the item;
determine a category of items including the identified item;
select, by the online concierge system, an item from the determined category, comprising:
retrieving an amount of compensation the online concierge system receives from an entity associated with one or more items of the determined category for selecting an item of the one or more items;
access a purchase model for predicting a probability of the user purchasing an item in the determined category, wherein the purchase model comprises a machine learning model trained by:
accessing a training dataset that describes attributes of an item of a determined category and historical purchase information of the item included in the historical orders from the user;
performing a learning process on the purchase model to train the weights of the model based on the training dataset;

updating the training dataset with recent purchase information; and retraining the purchase model based on the updated training dataset;

determining a probability of the user purchasing each item of the determined category, wherein determining the probability comprises: applying the trained purchase model to each combination of the user and an item in the determined category;

converting the amounts of compensation the online concierge system receives for selecting the item of the one or more items and the determined probabilities into a common unit of measurement;

calculating a value for each item of the determined category by combining the converted amounts of compensation the online concierge system receives and the determined probabilities into a common unit of measurement; and selecting an item of the determined category based on the calculated values; and generate, by the online concierge system, an interface for the order for which the request was received that includes information identifying the selected item from the determined category for display to the user without receiving input from the user.

10. The computer program product of claim 9, wherein the instruction to identify the item having the interval between orders greater than the amount of time between the time of the most recent previously received order including the item and the time when the request to create the order was received that is within the threshold duration of the interval between orders stored in association with the user and with the item comprises:

identifying an item for which the amount of time between the time of the most recent previously received order including the item and the time when the request to create the order was received is greater than the interval between orders stored in association with the user and with the item.

11. The computer program product of claim 9, wherein the instruction to select, by the online concierge system, the item from the determined category comprises:

selecting the identified item.

12. The computer program product of claim 9, wherein the instruction to select, by the online concierge system, the item from the determined category comprises:

selecting an item having a maximum probability of being purchased by the user from the determined category.

13. The computer program product of claim 9, wherein the instruction to select, by the online concierge system, the item from the determined category comprises:

determining differences between a probability of the user purchasing the identified item and probabilities of the user purchasing each alternative item in the determined category; and selecting an alternative item in the determined category having a minimum difference between the probability of the user purchasing the identified item and the probability of the user purchasing the alternative item in the determined category.

14. The computer program product of claim 9, wherein the instruction to select, by the online concierge system, the item from the determined category comprises:

determining a predicted availability of the identified item at a warehouse identified by the request;

in response to the predicted availability of the identified item at the warehouse being less than a threshold availability, determining a probability of the user purchasing each alternative item in the determined category; and selecting an alternative item in the determined category having a maximum probability of being purchased by the user.

15. The computer program product of claim 9, wherein the instruction to select, by the online concierge system, the item from the determined category comprises:

determining a predicted availability of the identified item at a warehouse identified by the request;

in response to the predicted availability of the identified item at the warehouse being less than a threshold availability, retrieving stored information associated with the user by the online concierge system identifying one or more replacement items for the identified item; and selecting a replacement item.

16. The computer program product of claim 9, wherein the instruction to select, by the online concierge system, the item from the determined category comprises:

determining a predicted availability of the identified item at a warehouse identified by the request;

in response to the predicted availability of the identified item at the warehouse being less than a threshold availability, retrieving stored information associated with the user by the online concierge system identifying one or more replacement items for the identified item;

determining a probability of the user purchasing each of the replacement items; and selecting a replacement item having a maximum probability of being purchased by the user.

* * * * *